(12) United States Patent
Fallis et al.

(10) Patent No.: US 7,797,422 B1
(45) Date of Patent: Sep. 14, 2010

(54) MANAGING AUDIT TABLES THAT TRACK SWITCH TRANSACTIONS IN A COMMUNICATIONS-NETWORKING ENVIRONMENT

(75) Inventors: Kevin Michael Fallis, Overland Park, KS (US); Kenneth James Aubuchon, Lenexa, KS (US); Kay Ellen Mitchell, Kansas City, MO (US); Stephan Dwayne Thomasee, Gladstone, MO (US); Daniel Christopher Wieschhaus, Shawnee, KS (US); Zbigniew Mastylo, Olathe, KS (US); Peter Tarlos, Olathe, KS (US); Andrea Lyn Ehlers, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 341 days.

(21) Appl. No.: 11/831,179

(22) Filed: Jul. 31, 2007

Related U.S. Application Data

(62) Division of application No. 10/727,807, filed on Dec. 4, 2003, now Pat. No. 7,293,043.

(51) Int. Cl.
*G06F 15/173* (2006.01)
(52) U.S. Cl. .................. 709/224; 709/223; 715/200
(58) Field of Classification Search .......... 709/223, 709/224; 715/200
See application file for complete search history.

(56) References Cited

U.S. PATENT DOCUMENTS

| | | | |
|---|---|---|---|
| 5,559,313 A | 9/1996 | Claus et al. | |
| 5,946,387 A * | 8/1999 | Miloslavsky | 379/265.12 |
| 6,178,449 B1 | 1/2001 | Forman et al. | |
| 6,446,092 B1 | 9/2002 | Sutter | |
| 6,636,877 B1 | 10/2003 | Doleac et al. | |
| 6,785,696 B2 | 8/2004 | Mosher et al. | |
| 7,085,782 B2 * | 8/2006 | D'Angelo et al. | 1/1 |
| 7,168,001 B2 * | 1/2007 | Johnson et al. | 714/13 |
| 7,170,989 B1 | 1/2007 | Aubuchon et al. | |
| 7,177,866 B2 | 2/2007 | Holenstein et al. | |
| 7,184,439 B1 | 2/2007 | Aubuchon et al. | |
| 7,194,426 B1 * | 3/2007 | Box | 705/26 |
| 2002/0184239 A1 * | 12/2002 | Mosher et al. | 707/200 |
| 2003/0069858 A1 * | 4/2003 | Kittlitz et al. | 705/76 |
| 2004/0024764 A1 * | 2/2004 | Hsu et al. | 707/9 |
| 2004/0044631 A1 | 3/2004 | Walker et al. | |
| 2004/0230623 A1 * | 11/2004 | D'Angelo et al. | 707/202 |

* cited by examiner

*Primary Examiner*—Nathan Flynn
*Assistant Examiner*—Mohamed Wasel

(57) ABSTRACT

A method and data structure for monitoring the progression of a configuration transaction through a communications network is provided. The method includes creating an audit trail associated with the switch-transaction progression, iteratively updating the audit trail incident to an occurrence of a designated transaction-processing substep without overwriting previously stored data, and processing the audit trail so that it is available for access via a user interface. Historical data tracking the configuration transaction's process is preserved rather than overwritten.

21 Claims, 5 Drawing Sheets

MANAGING AUDIT TABLES THAT TRACK SWITCH TRANSACTIONS IN A COMMUNICATIONS-NETWORKING ENVIRONMENT

PRIORITY

The present application is a divisional of, and claims priority from, co-pending U.S. application Ser. No. 10/727,807 filed Dec. 4, 2003, entitled "METHOD AND DATA STRUCTURE FOR TRACKING SWITCH TRANSACTIONS IN A COMMUNICATIONS-NETWORKING ENVIRONMENT."

INTRODUCTION

A telecommunications network is composed of a variety of components. In addition to routers, signal-control points, and hubs, switches are ubiquitous components found in almost all communications networks. Switches process configuration transactions. Transactions can perform a variety of tasks. A transaction may be as simple as an entry or update in a database or as complex as processing a set of sequences that perform an ultimate task. As is appreciated in the art, a typical task for a transaction to complete is to add, delete, or otherwise modify data in a switch table.

Two types of data are common in a telecommunications-network environment: business data and administrative or transaction data. As used herein, business data refers to longer-term data that describes physical aspects of a network. Exemplary business data includes NPA-NXX codes, switch identifiers, trunk identifiers, trunk-group identifiers, station ranges, point of presence identifiers, network-element addresses, component locations, and the like. Transaction data is short-term data substantially limited to the lifespan of a transaction. Exemplary transaction data includes data such as a transaction ID, a time stamp, a status identifier, request information, a requestor's name, etc. Historically, business data has been stored in the same tables as transaction data. Although such a scheme may have been adequate for simple communications networks, it is an inefficient data model that suffers from several disadvantages that are exemplified in a complex communications network.

A first problem associated with storing business data and transaction data in a common table is data duplication. That is, data is unnecessarily repeated across many tables. For instance, a first table may store a transaction ID, a time stamp, and a first parameter. For certain business reasons, a second table may store the same transaction ID and maybe even a time stamp, but a second parameter. Historically, data has been stored in different databases to suit the needs of a communications carrier. For example, data associated with communications feeds has been maintained separately from business data, which has in turn been maintained separately from switch data. To the extent a table stores business data along with transaction data, then as the transaction data changes, the table or tables must also be updated, which leads to a second problem with storing business data with transaction data: updating tables is difficult.

If a first table having transaction data needs to be updated, then so too do all tables that share that common transaction data. Thus, either a user or application would need to update several tables associated with only a single change. Moreover, updating tables that share transaction data with business data is difficult because the data types of the various tables may be different. For example, a transaction ID field of a first table may be formatted to receive numerical input only. But a transaction ID field of a second table may be configured to accept data as a text string. Thus, to update both tables with a new transaction ID, the data would first need to be formatted as a number and then formatted as a text string. In other situations, data masks may be applied in some tables but not in other tables. In still other situations, a data field of a first table may accept data having a certain number of digits, while a sister table may accept data associated with the same field but require a different number of digits. Thus, having to reconcile multiple formats for the same data file types was a laborious and time-intensive task.

A third problem associated with grouping transactional data with business data relates to fault recovery. Historically, recovering from an error transaction has been complicated by a lack of information available. In order to recover from an error transaction, one needs to know where the transaction failed so that it can be started up again at that point. However, determining where a transaction failed using methods available in the prior art has not allowed analysts to precisely determine where a transaction has failed, which highlights a fourth shortcoming of the prior art. The prior art does not offer the ability to establish an audit trail associated with a transaction's progress.

Traditionally, old status data has been overwritten with new status data. Overriding status data deprives an analyst of visibility as to prior happenings within the switch. The lack of ability to establish an audit trail removes the ability for a user to identify at what point during a transaction's progression the transaction failed. Moreover, without an audit trail, no metrics associated with transaction-processing characteristics can be gleaned; this makes inefficiencies difficult if not impossible to identify and prohibits benchmarking for users. That is, no evaluation can be made at a user level.

The prior art could be improved by providing a system and method for maintaining a record of transaction data related to but separate from business data in a telecommunications-networking environment.

SUMMARY OF THE INVENTION

The present invention solved at least the above problems by providing a system, method, and data structure for separating transaction-dependent data from transaction-independent data. In one embodiment, the present invention separates transaction data from its corresponding source, or business data. The present invention has several practical applications in the technical arts including reducing or eliminating data duplication. As a transaction progresses, only data associated with the transaction progression needs to be provided, but not business data associated with the transaction.

Moreover, the present invention greatly simplifies updating a transaction's status. More than just updating a transaction status, the present invention allows greater detail associated with the status of a transaction's progress to be provided. No longer is there a need to update several tables or to format data differently for different fields that store a common data item. Also, the present invention enhances troubleshooting. By establishing an audit trail, the present invention does not overwrite old data with new data.

Rather, the present invention maintains a historical log associated with a transaction's progression. This allows metrics about transaction-processing characteristics to be gained. With these metrics, users can establish benchmarking for evaluation purposes and to identify users that need to be trained. The present invention allows rapid identification of transaction inefficiencies by creating an audit trail. Thus, the present invention can rapidly identify faults by monitoring the progression of a transaction through a communications network and logging data associated with the progress of the transaction in one or more memories that store data distinct from business data.

In a first aspect, computer-readable media having computer-useable instructions for tracking the progression of a switch transaction is provided. The method includes creating an audit trail associated with the switch-transaction progression, iteratively updating the audit trail incident to an occurrence of designated transaction-processing substeps without overwriting previously stored data, and processing the audit trail so that it is available for access by a user interface.

In a second aspect, a machine-implemented method is provided for facilitating telecommunications-network configuration-transaction processing. The method includes maintaining a first table that stores transaction-independent data and a second table that stores transaction-dependent data. The tables are linked by a transaction identifier so that without user intervention, the second table (but not the first table) is iteratively updating incident to the occurrence of certain predestined substeps of the configuration transaction.

In a third aspect, a memory is provided for storing data associated with creating a transaction-audit trail for access by an application program being executed on a computing device. The present invention includes both information used by application programs and information regarding physical interrelationships within a memory. The memory includes a first data structure stored that includes a transaction-progression table that tracks transaction statuses respectively associated with completing a plurality of subtransaction steps. The memory also includes a set of computer-useable instructions that prevent subsequent transaction statuses from overwriting previous transaction statuses.

In a fourth aspect, the present invention includes computer-readable media having stored thereon a data structure for monitoring the progression of a telecommunications switch transaction. The data structure includes a first table that stores a transaction-request identifier, a first set of data that does not change as the switch transaction progresses toward completion, and no data that does change as the switch transaction progresses toward completion. A second table is logically associated with the first table and is iteratively updated as the switch transaction progresses toward completion. The second table stores the transaction-request identifier and a second set of data that do changes as the switch transaction progresses toward completion. The data that does change can be limited to the lifespan of a configuration-transaction request and includes an indication of the request's status at some point in time or interval.

In a final exemplary aspect, the present invention includes a method for increasing the efficiency of a communications network by storing business data in a table separate from transaction data.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
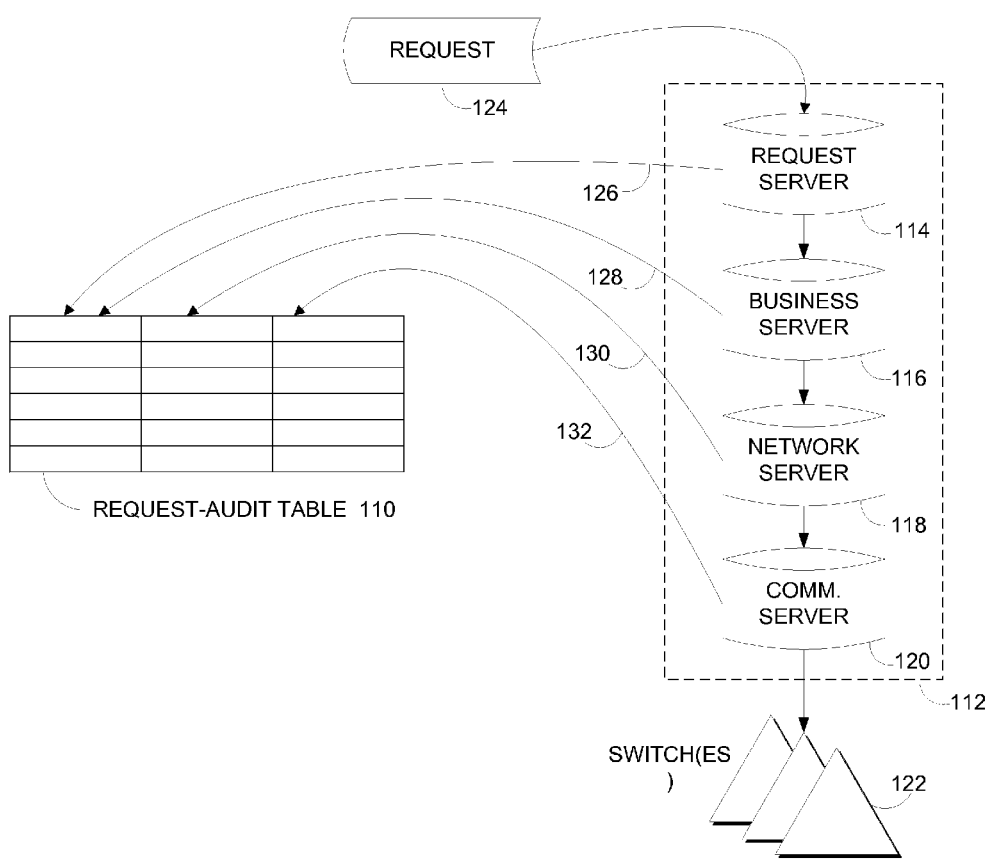
FIG. 1 depicts an exemplary operating environment suitable for practicing an embodiment of the present invention.

The present invention provides a method and data model that enables an audit trail to be maintained of configuration transaction requests as they progress through a communications network. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AT | Access Tandem |
| CLLI | Common Language Location Identification |
| EO | End Office |
| NPA | Numbering Plan Area (Area Code) |
| NXX | Prefix - first three digits of telephone number after NPA |
| POP | Point Of Presence |
| POP CLLI | CLLI that identifies a point of presence |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media, which are non-transitory, include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a telecommunications network. FIG. 1 indicates an exemplary operating environment suitable for practicing the present invention and is referenced generally by the numeral 100. Operating environment 100 should not be construed as a limitation of the present invention. Additional components that can be used in connection with the present invention are not shown so as to not obscure the present invention.

Exemplary operating environment 100 includes a request-audit table 110 and a transaction-processing system 112. Transaction-processing 112 includes a request server 114, a business server 116, a network server 118, and a communications server 120. Transaction-processing system 112 is shown in block-diagram form with only a few exemplary components so as to not obscure the present invention. Those skilled in the art will appreciate that a transaction-processing system may include a litany of other components, which are contemplated within the scope of the present invention but not shown. Transaction-processing system 112 is coupled to one or more communications switches 122.

The servers illustratively shown as components of transaction-processing system 112 may be known by other names but illustrate that a transaction request ("request") 124 progresses through a processing system. Thus, the present invention should not be construed as a method or system limited to a request that progresses through the illustrative servers shown. Rather, FIG. 1 illustrates that a request 124 progresses through several transitional states toward completion.

In the simplified environment shown, request 124 is received by request server 114. At a step 126, one or more entries are made into request-audit table 110, which will be explained in greater detail below. The table entries describe aspects of a transaction request related to its progression through a network. Exemplary entries include an indication that request 124 was received by request server 114, that request server 114 is processing request 124, that request server 114 has completed processing its portion of functionality associated with request 124, or any other indication of a subprocessing step. Processing continues to business server 116.

At a step 128, request-audit table 110 is updated to reflect the progression of transaction request 124. The updates of step 128 may include an indication that the transaction request has been received, is being processed, or has been completed by business server 116. Processing continues onto network server 118, which performs actions on request 124 and updates request-audit table 110 at a step 130. In a final exemplary process, request 124 is sent to communications server 120. At a step 132, the different statuses associated with communication server 120 are updated in request-audit table 110. When transaction request 124 is sent to one or more communications switches 122, an entry can be made in a single table, such as request-audit table 110, that the transaction has been processed and sent to the network. By updating only a single table, the method described with reference to FIG. 1 allows an audit trail to be developed, whereby problems that occur during the progression of request 124 can be more easily identified.

Figure 2:
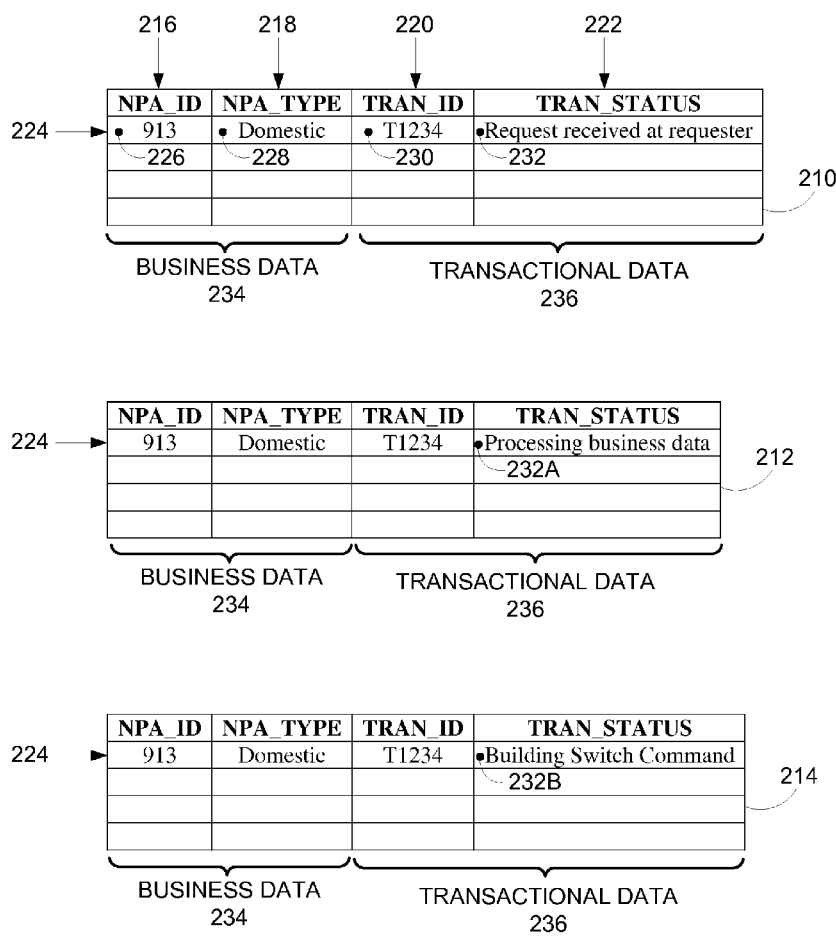
FIGS. 2 and 3 are block diagrams that depict several inefficiencies of a data model that stores transaction data with business data in the same table and across multiple tables.
Figure 3:
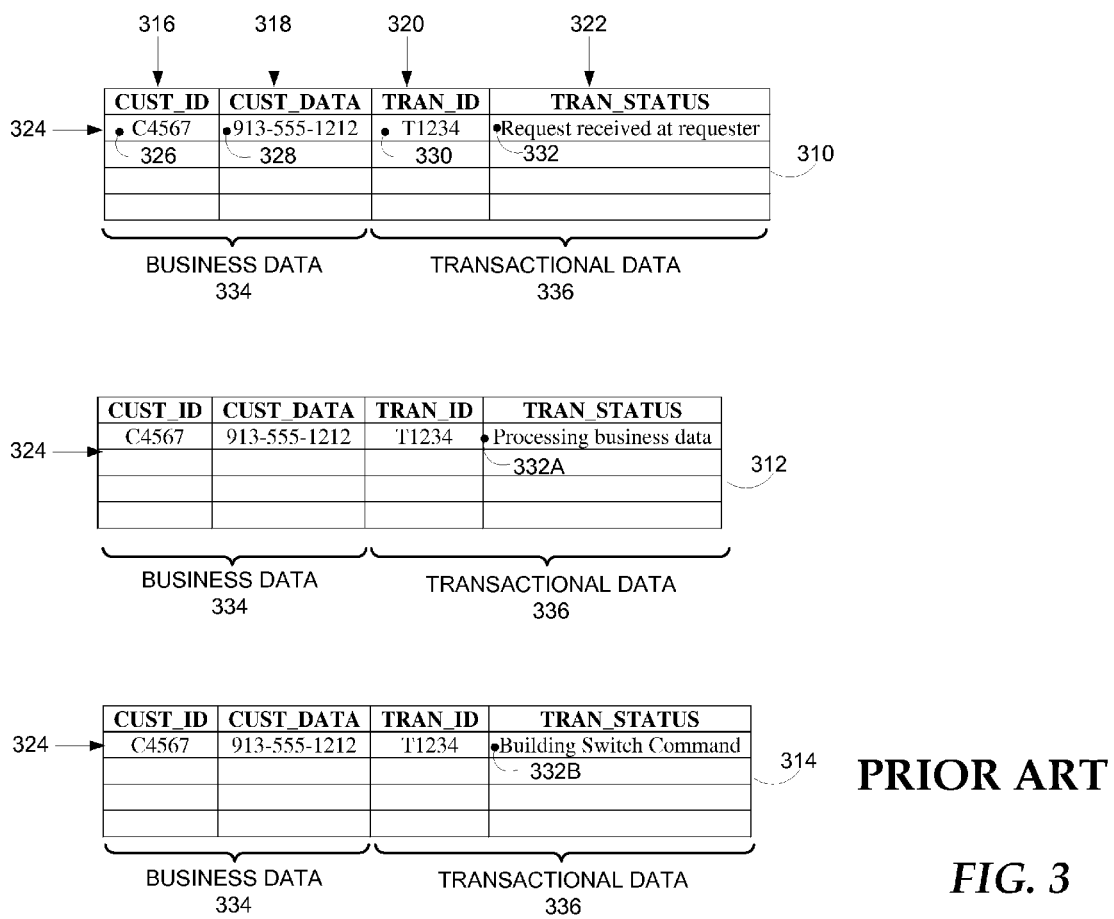

To further illustrate a portion of the benefits associated with the present invention, FIGS. 2 and 3 depict a set of tables that include both business data and transaction data. As used herein, "business data" refers to transaction-independent data (except for a transaction identifier) and "transaction data" refers to transaction-dependent data, or data that does not vary as a transaction processes through various components toward completion. Turning now to FIG. 2, three instances of an NPA table are shown and referenced by numerals 210, 212, and 214. The NPA table relates NPA data with transaction data. NPA table 210 includes four columns—216, 218, 220, and 222—that respectively correspond to an NPA ID, an NPA type, a transaction ID, and a transaction-status identifier (transaction status). A single row 224 is shown that reflects an NPA ID of "913," an NPA type of "domestic," a transaction ID of "T1234," and a transaction status of "request received at requestor." These fields are respectively shown by reference numerals 226, 228, 230, and 232. As can be seen, business data 234 is undesirably housed in table 224 along with transaction data 236. Historically, when the status of a transaction's progression changed, old data was overwritten with new data.

Absent the present invention, when a transaction's status changed, the new status was merely updated from a previous status. Stored in a single field, the status identifier would be perpetually overwritten by new updates. In a specific, arbitrary example, after a request had been received from the requestor and the request progressed to being processed by business data, the transaction status of "request received at requestor" reflected in cell 232 would be replaced with a transaction status of "processing business data" as reflected in cell 232A, which is the same cell as cell 232 but numerically distinguished for explanatory purposes.

Thus, table 212 reflects an updated transaction status that has overwritten a previous status identifier. Table 212 is the same table as table 210 but is denoted by a unique reference numeral to explain the present invention. To further illustrate at least one problem historically associated with storing business data 234 in the same table as transaction data 236, table 214 reflects that a transaction status of "building switch command" in cell 232B has overwritten the previous status identifier of "processing business data," reflected in cell 232A.

As can be seen by the simplified illustration of FIG. 2, there is no way to retrieve any type of historical data or audit trail associated with the progression of a transaction request. Without an audit trail, no metrics can be gleaned and no performance benchmarks. Thus, if a user wished to track the time lapse between when a transaction request was received to when the processing of business data began, such data would not be available to a user.

Another problem associated with grouping business data with transaction data in the same table is that updating transaction-processing statuses involves updating multiple tables. This is because data must be unnecessarily duplicated across multiple tables. An example of these inefficiencies can be illustrated with reference to FIG. 3.

Turning now to FIG. 3, three instances of the same table are shown and referenced respectively by numerals 310, 312, and 314. Table 310 includes a customer-identifier column 316, a customer-data column 318, a transaction-ID column 320, and a transaction-status column 322. Table 310 includes one row 324 having four cells referenced by numerals 326, 328, 330, and 332. Here, business data 334 (which includes customer ID 316 and customer data 318) is inefficiently stored in the same table as transaction data 336 (which includes transaction ID 320 and transaction status 322). Table 310 observed in connection with table 210 of FIG. 2 illustrates that the transaction ID and transaction status records are duplicated in two tables.

The transaction ID of "T1234" is stored both in cell 230 of table 210 and in cell 330 of table 310. Similarly, the transaction-status identifier is stored both in cell 232 of table 210 and in cell 332 of table 310. When the status of a transaction request changes, both tables must be updated. For example, when the transaction request's status transitions from "request received at requestor" to "processing business data," then both tables 210 and 310 must be updated. Updating table 310 has historically been done by overwriting the data in cell 332 with new data, such as "processing business data" as reflected in cell 332A, which is the same cell as cell 332 but referenced here with a unique numeral to ease description of the present invention.

When the transaction status changes to "building switch command," tables 212 and 312 must both be updated as respectively reflected in tables 214 and 314. The present invention provides a data structure whereby transaction data is stored separately from business data.

Figure 4:
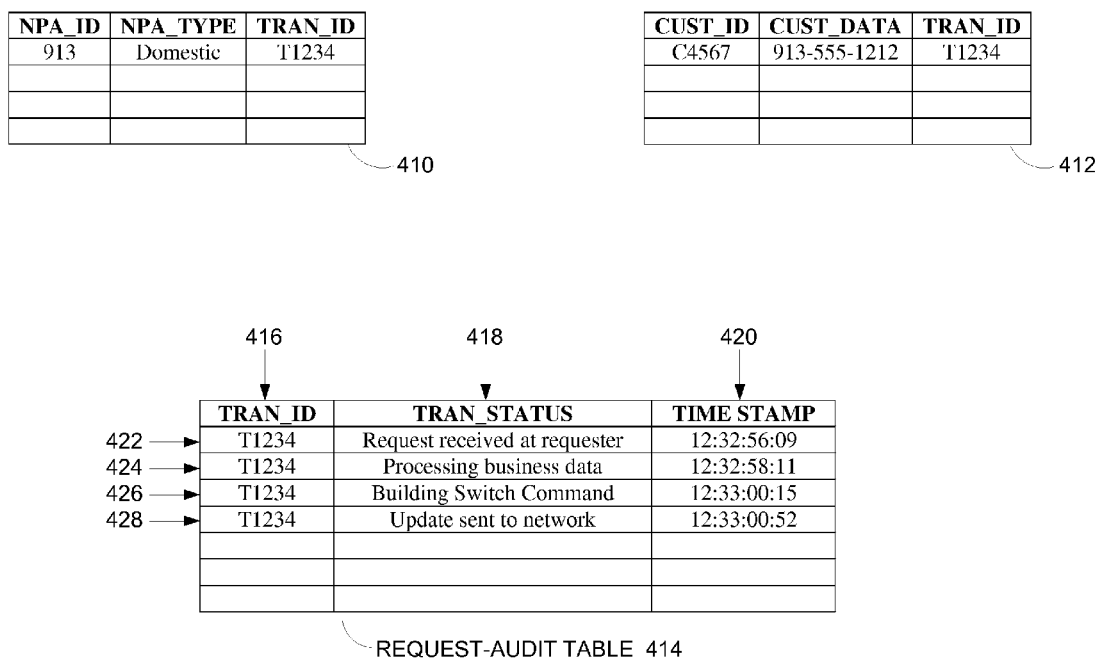
FIG. 4 is an exemplary data model according to an embodiment of the present invention that stores business data separate from transaction data.

Turning now to FIG. 4, an exemplary data model according to an embodiment of the present invention is shown with reference to two illustrative tables 410 and 412 that store business data while a third table 414 stores transaction data. A transaction identifier is included in table 410, linking it to the transaction data of table 412. Those skilled in the art would appreciate that additional transaction data is stored in tables 210 and 310, but only the "transaction status" column was provided for clarity purposes. Table 410 now has no need to store all of such transaction data. Similarly, table 412 is a customer table that associates business data of a customer ID and other customer data with a single identifier, namely a transaction identifier, such as "transaction ID."

The transaction-ID field of tables 410 and 412 is linked to a request-audit table 414 by a single field, the transaction ID field. The request-audit table includes a transaction-ID column 416, a transaction-status column 418, and a time-stamp column 420. Request-audit table 414 includes a first row 422, a second row 424, a third row 426, and a fourth row 428. Each of these rows corresponds to a desired logable event and should not be construed as a limitation of the present invention. Any event that is desirous to log can be logged and tracked.

Rows 422 through 428 are exemplary rows that may, for example, be byproducts of the method in FIG. 1. For instance, with reference to FIG. 1, when request 124 was received at request server 114, then step 126 can be associated with generating row 422, which indicates that transaction "T1234" is in a status of "request received at requestor" and occurred at a time "12:32:56:09." As processing continues to business server 116, row 424 may be generated during step 128. Instead of overwriting the old data, the present invention enters a new row, row 424, to indicate a status transition to "processing business data."

The data model of the present invention provides that only a single table, request-audit table 414, needs to be updated rather than multiple tables as has historically been the case. That is, tables 410 and 412 do not need to be updated incident to a transaction-status change. Thus, when request 124 advances toward completion to network server 118, then during step 130, row 426 may be generated. Row 426 indicates that transaction ID "T1234" is associated with a status of "building switch command" at a time of "12:33:00:15." Again, even though the status of the transaction at issue changed, tables 410 and 412 do not need to be modified. Moreover, adding row 426 (as opposed to overwriting old data) creates an audit trail.

In a final illustrative step, row 428 is created when the status of request 124 transitions to "update sent to network." From table 414, it is clear that an audit trail has been established that marks the progression of the transaction request. Although only four transaction-status updates are shown, any number of status updates can be logged in accordance with an embodiment of the invention. That is, if a carrier wishes to log any number of events, then this functionality is offered by the present invention. A carrier, or other user, may wish to log five, ten, fifty, or however many steps of a request transaction. Each can be logged, and an audit trail associated with those events can be easily created.

The time stamps in column 420 denote the time associated with each event, or step, of a request transaction. Having this audit trail available enables a user to establish benchmarks and to evaluate problems associated with a communications network. For instance, if there was a large time gap between when the request was received at the requestor and when the business server 116 received request 124, then a determination can be made that interim processes are not operating efficiently. A difference between any two or multiple time stamps can be used to identify inefficiencies.

The present invention also enables inefficiencies to be associated with individuals. For instance, if a transaction analyst was responsible for insuring that data be communicated from network server 118 to communication server 120, but a consistent time gap consistently appears between when a request leaves network server 118 and when it reaches communication server 120, then it can be reasonably inferred that the person in charge of the task at issue may need to be trained on how to route data more effectively. The person, code segment, or other mechanism responsible for routing a request from a first component to a second component can be trained or optimized to route data more efficiently when unacceptable time gaps are observed.

The data model of FIG. 4 also makes recovering from error transactions much easier than has historically been possible.

The audit trail of request-audit table 414 allows an analyst to view a transaction progression from when it starts to when it faults and everything in between. Thus, no visibility is lost from when a first transaction status transition to a second transaction status. As shown in FIG. 4, historical transaction data is maintained separately from the business data of tables 410 and 412. This structure ensures that transaction statuses are not overwritten when new statuses arrive and it eliminates the problem of having redundant transaction data spread across multiple tables. No longer do multiple tables need to be accessed and information gathered about the transaction to determine, or attempt to determine, when a transaction entered into a fault status.

The tables shown in FIG. 4 are overly simplified so as to not obscure the present invention. But in practical applications, switch tables may include several tens of columns and thousands or hundreds of thousands of rows. Moreover, transaction data is often stored across several tables, not merely two. Also, table 414 indicates only two transaction data items: transaction status and transaction time stamp. But in practice, a transaction may be associated with several or even tens of columns of data rather than merely two.

An exemplary method for processing a switch transaction follows. A transaction request is received. User data is formatted by a business-side process and the transaction is associated with respect to business data. The information from the business data is placed into a transaction table to be communicated to one or more switches. A distributor then distributes the information to the appropriate switches. After the switches process their respective updates, switch responses are received. The information received from the switches is formatted into one or more response tables. Finally, the transaction is denoted as successful or not. Because of these steps and the way a configuration transaction, another name for request 124, is processed, both the idea and implementation of a data structure that maintains business-type data separately from transaction-type data is nonobvious. Because a communications network grows over time, legacy systems have business data intimately entwined with transaction data. Separating transaction data from business data at the table level is a resource-intensive process that requires a paradigm shift, whereby a focus is placed on processing transactions rather than merely retrieving data.

Figure 5:
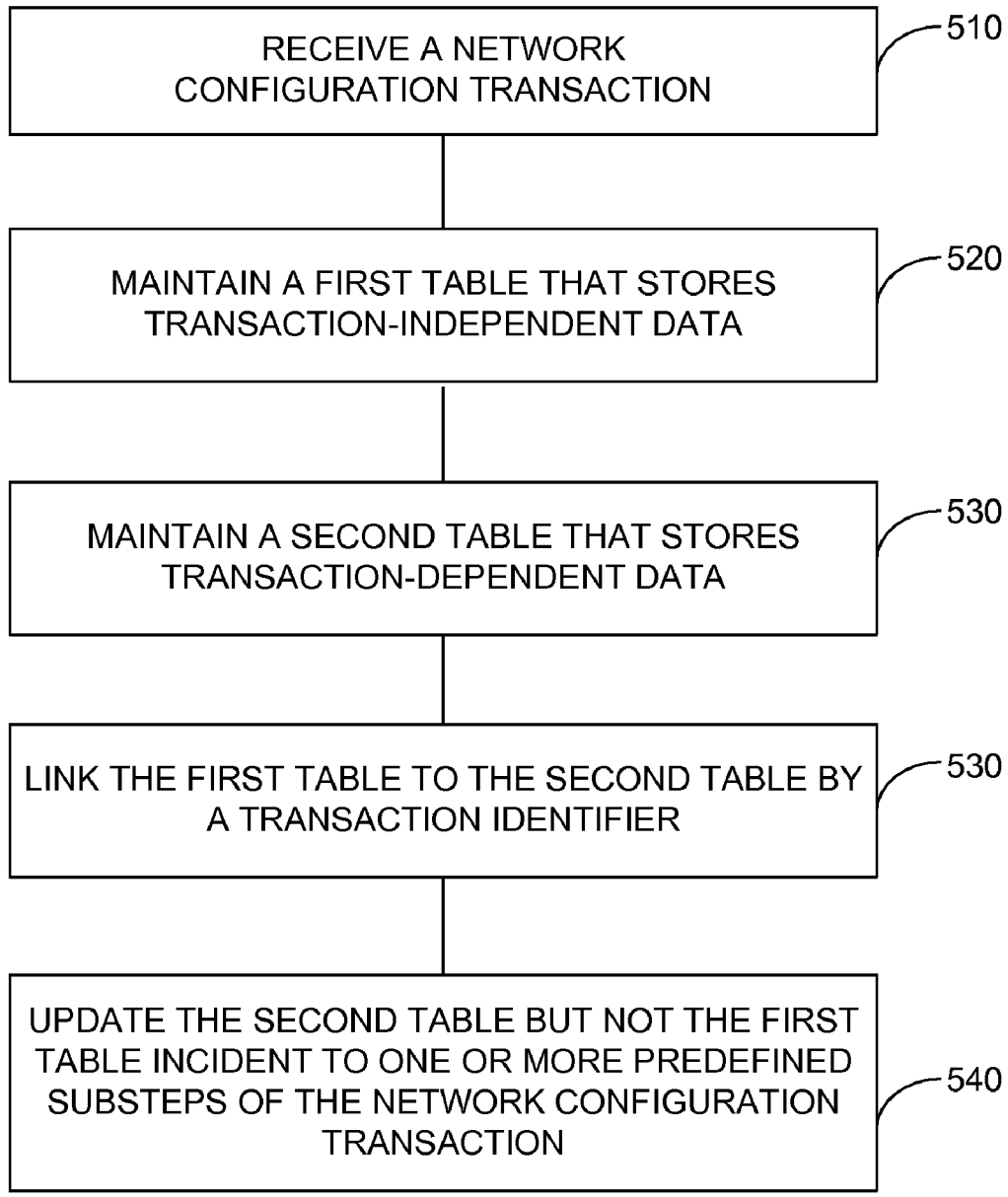
FIG. 5 is an exemplary flow diagram that illustrates a method for facilitating telecommunications network configuration transaction processing, according to an embodiment of the present invention.

Turning now to FIG. 5, which is an exemplary method for facilitating telecommunications network configuration-transaction processing in a switch. In step 510, the switch receives a network configuration transaction. The switch processes the configuration transaction and maintains a first table that stores transaction-independent data, in step 520. Also, in step 530, the switch maintains a second table that stores transaction-dependent data. In turn, a transaction identifier is utilized to link the first and second table, in step 540. In step 550, predefined substeps associated with the network configuration transaction update the second table having the transaction-dependent data.

Historically, systems were data centric where tables were wrappers around a resource such as a switch. The present invention is centered around transactions and tracking those transactions rather than mere data. Historically, the central focus and objective was to have a switch store certain data and then mirror that same data in local tables. Moreover, there was little focus on the status of a switch transaction as it progressed through various components. That is, a primary emphasis was placed on attaining a final status, but little emphasis was placed on monitoring the subprocesses that ripened into the final status. Transaction requests were viewed almost as afterthoughts as a means to arrive at a goal.

But the present invention stems from a realization that the journey is as important, if not more important, than the destination. The present invention reflects a more comprehensive view where the transaction itself is the center of focus. Emphasis is placed on how a transaction is processed. That is, observing the transaction yields an indication of desired data rather than merely focusing on switch data to mimic its contents into local tables.

As can be seen, the present invention and its equivalents are well-adapted to increasing the efficiency of a communications network. Many different arrangements of the various components depicted, as well as components not shown, are possible without departing from the spirit and scope of the present invention. Those skilled in the art will appreciate the litany of additional network components that can be used in connection with the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more non-transitory computer-readable storage media having computer-useable instructions embodied thereon to be processed by a computing device to perform a method of tracking the progression of a switch transaction through one or more communications components, the method comprising:

creating an audit trail associated with the switch-transaction progression;

iteratively updating the audit trail incident to an occurrence of one or more designated transaction-processing substeps without overwriting previously stored data; and processing the audit trail whereby it is available for access via a user interface.

2. The media of claim 1, wherein creating the audit trail comprises:

storing a set of transaction-independent data in a first table;

storing a set of transaction-dependent data in a second table; and linking the first table to the second table.

3. The media of claim 2, wherein linking the first table to the second table includes commonly storing a transaction identifier in both the first table and the second table.

4. The media of claim 2, wherein transaction-independent data is data that does not change as the switch transaction progresses toward completion.

5. The media of claim 4, wherein transaction-dependent data is data that changes as a switch transaction progresses toward completion.

6. The media of claim 5, wherein data that changes as a switch transaction progresses toward completion includes a switch-transaction-status identifier that describes a status of the switch transaction at a particular time or interval.

7. The media of claim 6, wherein iteratively updating the audit trail includes updating the switch-transaction-status identifier.

8. A computer-implemented method of tracking the progression of a switch transaction through one or more communications components, the method comprising:
creating an audit trail associated with the switch-transaction progression;
iteratively updating the audit trail incident to an occurrence of one or more designated transaction-processing substeps without overwriting previously stored data; and
processing the audit trail whereby it is available for access via a user interface.

9. The computer-implemented method of claim 8, wherein creating the audit trail comprises:
storing a set of transaction-independent data in a first table;
storing a set of transaction-dependent data in a second table; and
linking the first table to the second table.

10. The computer-implemented method of claim 9, wherein linking the first table to the second table includes commonly storing a transaction identifier in both the first table and the second table.

11. The computer-implemented method of claim 9, wherein transaction-independent data is data that does not change as the switch transaction progresses toward completion.

12. The computer-implemented method of claim 11, wherein transaction-dependent data is data that changes as a switch transaction progresses toward completion.

13. The computer-implemented method of claim 12, wherein data that changes as a switch transaction progresses toward completion includes a switch-transaction-status identifier that describes a status of the switch transaction at a particular time or interval.

14. The computer-implemented method of claim 13, wherein iteratively updating the audit trail includes updating the switch-transaction-status identifier.

15. A computer system having a processor and one or more memories, wherein the processor is configured to execute a method of tracking the progression of a switch transaction through one or more communications components, the method comprising:
creating, by the processor, an audit trail associated with the switch-transaction progression in a request-audit table;
iteratively updating, by the processor, the audit trail incident to an occurrence of one or more designated transaction-processing substeps without overwriting previously stored data in the one or more memories; and
formatting, by the processor, the audit trail whereby it is available for access via a user interface.

16. The computer system of claim 15, wherein creating the audit trail comprises:
storing a set of transaction-independent data in a first table;
storing a set of transaction-dependent data in a second table; and
linking the first table to the second table.

17. The computer system of claim 16, wherein linking the first table to the second table includes commonly storing a transaction identifier in both the first table and the second table.

18. The computer system of claim 16, wherein transaction-independent data is data that does not change as the switch transaction progresses toward completion.

19. The computer system of claim 18, wherein transaction-dependent data is data that changes as a switch transaction progresses toward completion.

20. The computer system of claim 19, wherein data that changes as a switch transaction progresses toward completion includes a switch-transaction-status identifier that describes a status of the switch transaction at a particular time or interval.

21. The computer system of claim 20, wherein iteratively updating the audit trail includes updating the switch-transaction-status identifier.

* * * * *